No. 829,305. PATENTED AUG. 21, 1906.
J. J. VAN BROEKHOVEN.
SHEARS.
APPLICATION FILED MAR. 7, 1905.

WITNESSES
W. M. Kuehne
John A. Percival

INVENTOR
Jacobus J. van Broekhoven
BY Richards
ATTORNEYS

UNITED STATES PATENT OFFICE.

JACOBUS JOHANNES VAN BROEKHOVEN, OF WŸCHEN, NETHERLANDS.

SHEARS.

No. 829,305.   Specification of Letters Patent.   Patented Aug. 21, 1906.

Application filed March 7, 1905. Serial No. 248,817.

*To all whom it may concern:*

Be it known that I, JACOBUS JOHANNES VAN BROEKHOVEN, a subject of the Queen of the Netherlands, residing at Wÿchen, Gelderland, Kingdom of the Netherlands, have invented certain new and useful Improvements in Shears, of which the following is a specification.

This invention relates to shears for the cutting of low-growing herbage, such as purslane and the like.

Hitherto the custom has been to grasp the herbage with one hand and to cut it off with the other by means of an ordinary knife, a pruning-knife, or the like. This method takes considerable time and labor, and it is quite inevitable that the herbage will get mixed with mold and other objectionable substances, which must be removed afterward with great difficulties, and much loss of time being thus entailed.

This invention has for its object to provide shears by means of which better work can be done in much shorter time than has been possible hitherto, the herbage being prevented from falling down. To this end the blades of the shears are extended at the outside in a vertical direction in such a way that upwardly-extending flanges or rims are formed. The flange on the left-hand side is lower than that on the right-hand side. In all other respects the shears are of ordinary construction.

The left-hand flange is intended to divide the herbage, so as to facilitate the pushing forward of the shears, and the right-hand flange supports the herbage during the cutting operation and maintains it on the blade. After three or more cuts have been made the contents of the blade are thrown into a basket placed at the operator's left-hand side, the left-hand flange being made low to facilitate this.

The accompanying drawings show one form of shears constructed according to this invention.

Figure 1:
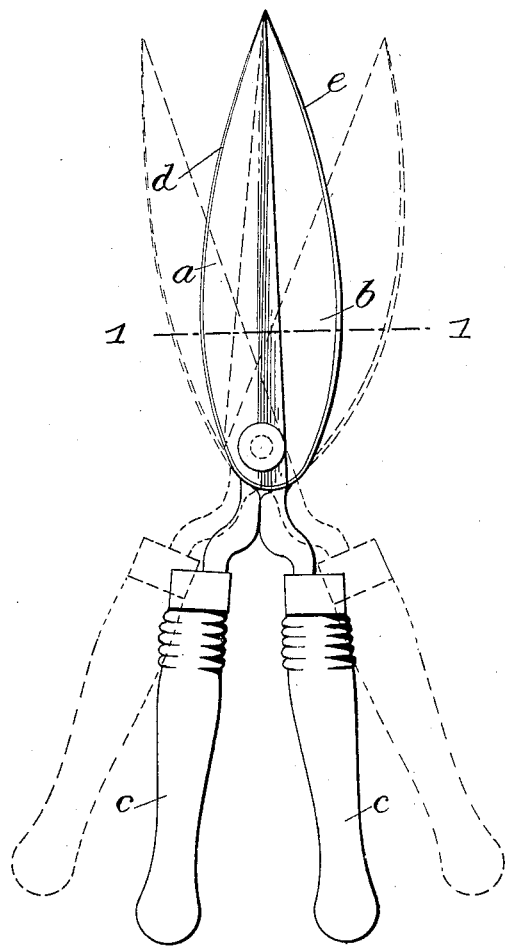
Figure 2:
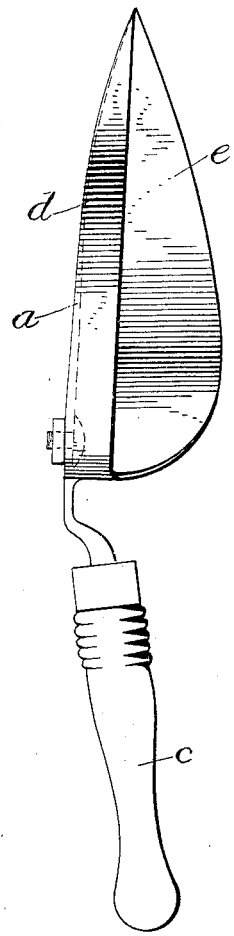
Figure 3:
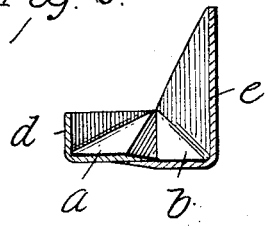

Figure 1 is a plan view showing the shears in their closed position, the open position being indicated in broken lines. Fig. 2 is a side view. Fig. 3 is a section on line 1 1 of Fig. 1.

The shears have two blades $a$ and $b$ and handles $c$. The left-hand blade $a$ has a low upright flange $d$, the right-hand blade $b$ a higher one, $e$. These flanges are made in one piece with the blades, as shown in the drawings. The shears are kept as light as possible, and the steel used should be of superior quality. The shears according to this invention are operated by both hands and pushed slowly forward. The herbage is cut off and gathered on the right-hand blade $b$.

The great advantages of shears constructed according to this invention are in considerable saving of time effected in their operation and in the fact that the herbage is not touched by the hand, while it is also prevented from falling upon the ground and mixing with mold and other objectionable substances.

What I claim as my invention, and desire to secure by Letters Patent, is—

1. In shears for low-growing herbage the combination of two shears-blades pivoted to each other, said blades when closed forming a substantially oval figure, operating-handles on said blades and narrow flanges extending upwardly from the extreme outer edges of the blades.

2. In shears for low-growing herbage the combination of two shears-blades pivoted to each other, handles for operating the blades, a flange extending upward from the outer edge of one blade and a flange extending upward from the outer edge of the second blade to a less height than the flange of the first blade.

3. In shears for low-growing herbage the combination of right and left hand flat shears-blades pivoted to each other, operating-handles on the blades, a flange formed in one piece with and extending upward from the outer edge of the right-hand blade and a flange formed in one piece with and extending upward from the outer edge of the left-hand blade to a less height than the flange of the right-hand blade.

In testimony whereof I have hereunto set my hand in presence of two subscribing witnesses.

JACOBUS JOHANNES VAN BROEKHOVEN.

Witnesses:
  ANDRIES A. HOEN,
  JOHANNES D. FÜHMIG.